United States Patent [19]

Newman

[11] 4,417,301

[45] Nov. 22, 1983

[54] METHOD AND APPARATUS FOR ELECTRIC FISH TRAWLING

[76] Inventor: James L. Newman, 970 Stacewood, Beaumont, Tex. 77706

[21] Appl. No.: 303,353

[22] Filed: Sep. 18, 1981

[51] Int. Cl.³ .......................................... H02M 7/155
[52] U.S. Cl. .................................... 363/129; 43/17.1; 307/106; 363/128
[58] Field of Search ................. 43/17.1; 307/106–108; 315/209 SC; 320/1; 363/84, 85, 87, 88, 128, 129

[56] References Cited

U.S. PATENT DOCUMENTS

| | | | |
|---|---|---|---|
| 2,745,205 | 5/1956 | Kafka | 43/17.1 |
| 2,778,140 | 1/1957 | Applegate et al. | 43/17.1 |
| 2,789,383 | 4/1957 | Solter | 43/17.1 |
| 2,836,735 | 5/1958 | Kreutzer | 307/110 |
| 2,903,813 | 9/1959 | Gudjohnsen et al. | 43/9 |
| 2,913,846 | 11/1959 | McLain | 43/17.1 |
| 3,043,041 | 7/1962 | Kreutzer | 43/17.1 |
| 3,058,252 | 10/1962 | Matusche | 307/107 X |
| 3,061,966 | 11/1962 | Kreutzer | 43/4.5 |
| 3,096,797 | 12/1962 | Kreutzer | 43/4.5 |
| 3,110,978 | 11/1963 | Kreutzer | 43/4.5 |
| 3,164,772 | 1/1965 | Hicks | 325/118 |
| 3,267,328 | 8/1966 | Girard | 320/1 X |
| 3,312,011 | 4/1967 | Wathane et al. | 43/9 |
| 3,369,318 | 2/1968 | Kreutzer | 43/17.1 |
| 3,377,542 | 4/1968 | Glorioso | 320/1 X |
| 3,415,001 | 12/1968 | Ott et al. | 43/17.1 |
| 3,436,514 | 4/1969 | Broomhall et al. | 320/1 X |
| 3,483,649 | 12/1969 | Klima et al. | 73/2 |
| 3,491,474 | 1/1970 | Metcalf, Jr. | 43/9 |
| 3,651,595 | 3/1972 | Newman | 43/9 |
| 3,777,388 | 12/1973 | Newman et al. | 43/9 |
| 4,038,560 | 7/1977 | Newman et al. | 307/106 |

OTHER PUBLICATIONS

"An Electric Trawl System for Lobsters", Saul B. Saila and Cecil E. Williams, MTS Journal v. 6, N. 5, Sep.–Oct. 1972.
"An Experiment in Electrical Fishing with an Electric Field Used as an Adjunct to an Otter-Trawl Net", Ernest D. McRae, Jr. and Leon E. French, Jr. Commercial Fisheries Review, Jun. 1965, vol. 27, No. 6.
"Use of an Electrical Attracting and Guiding Device in Experiments with a 'Fish Pump'", Keith A. Smith, Commercial Fisheries Review, Feb. 1955, vol. 17, No. 2.

Primary Examiner—William M. Shoop
Attorney, Agent, or Firm—Pravel, Gambrell, Hewitt, Kirk & Kimball

[57] ABSTRACT

An improved method of electric fish trawling which utilizes the fright-reaction exhibited by fish exposed to an electric field is disclosed. The method utilizes a trawling net equipped with electrodes which emit DC pulses having a repetition rate of six cycles per second or less, a pulse duration of approximately one millisecond, and producing a field having a voltage gradient of one-hundred eighty volts per meter. A pulse generating circuit, which uses full-wave rectified single phase power or three phase, half-wave rectified power for a condenser discharge circuit is also provided.

43 Claims, 6 Drawing Figures

METHOD AND APPARATUS FOR ELECTRIC FISH TRAWLING

BACKGROUND OF THE INVENTION

This invention relates generally to bottom fishing methods and more particularly to an improved method of bottom trawling for flat fish, utilizing a trawl net equipped with electrodes for charging the water in advance of the trawl net to stimulate the bottom fish and facilitate their capture.

DESCRIPTION OF THE PRIOR ART

Flat fish such as flounder, sole, plaice and like species lie on or burrow into the ocean floor. Conventional methods of capture of these fish utilize a trawl net towed along the sea bottom. Several methods to stimulate these bottom fish and thereby urge them off the ocean bottom so they may be captured in the trawl net have been employed. One method is to deploy a series of heavy chains in front of the net which frightens the fish in advance of the trawl net. In this method, links of chain running in the direction of tow connect parallel bights forming a loosely woven chain mat which is towed in advance of the trawl net. As the chain mat is dragged across the ocean bottom, the fish are frightened off the bottom and are then more easily captured in the following trawl net. While this method has been effective, it has proven to be expensive due to the replacement cost of the chain which is worn out by constant dragging over the bottom as well as in the increased fuel costs incurred by boats towing these heavy chain mats.

Researchers have long known that fish can be influenced by an electrical field present in the water around them. It is generally recognized that three distinct reactions occur in fish subjected to an electrical field. Where a fish is relatively far away from the source of pulsed direct current, it reacts with a feeling of apparent discomfort or fright but exhibits the capability to voluntarily escape the effects of the electrical field. This reaction is known as the "fright reaction". Fish who are closer to the source of pulsed direct current may be involuntarily drawn toward the positive anode source of the electrical field. This reaction is called electrotaxis. Fish which are still closer to the source of pulsed direct current have been observed to become tetanized. This condition is called electronarcosis. Heretofore, methods for electrical fishing have concentrated on utilizing electrotaxis and electronarcosis reactions. One such method is described in U.S. Pat. No. 2,745,205. While these phenomena are useful in collecting fish already schooled, as under a light for example, and urging them involuntarily toward the intake nozzle of a pump, they have limited usefulness in urging fish off the bottom of the ocean floor in the limited length of time available before a trawl net passes over the areas. Method and apparatus for electrical fishing are disclosed in the following U.S. Pat. Nos.: 2,778,140; 2,789,383; 2,836,735; 2,903,813; 2,913,846; 3,043,041; 3,061,966; 3,069,797; 3,110,978; 3,164,772; 3,312,011; 3,369,318; 3,415,001; 3,483,649; 3,491,474; 3,651,595; 3,777,388; 4,038,560. U.S. Pat. Nos. 4,380,560 and 3,777,388 of which applicant is a co-inventor, are for pulse generating circuits adapted for use in electric trawling systems for shrimp. It has been discovered that much higher voltages are needed to produce the desired fright reaction in fish than in shrimp harvesting methods. While the circuits disclosed in U.S. Pat. Nos. 3,777,388 and 4,038,560 have proved satisfactory in shrimp-harvesting applications, in order to produce the desired effect for bottom-fish trawling, circuits producing higher voltage levels and consequently increased electric field strength have been found to be necessary. Known circuits for producing the required voltage level are either too complex or bulky to be deployed economically on the trawl nets under water and thus have not produced satisfactory results.

SUMMARY OF THE INVENTION

In contrast to the foregoing, the method of the present invention utilizes the "fright reaction" exhibited by fish exposed to low level electric fields. The present invention charges the water in advance of the trawl net with pulsed DC current having a repetition rate of less than six cycles per second, a pulse duration of approximately one millisecond (for sixty-three percent decay) producing a field having a field strength in the order of one-hundred eighty volts per meter voltage gradient. The particular parameters have been found to be sufficient to produce the desired fright reaction in fish and provide a sufficient time period between pulses to enable fish to react and swim off the bottom thereby facilitating their capture in the trawl new which follows the electrodes. A novel, computerized, reliable electrical circuit which utilizes full-wave rectified single phase power or half-wave rectified three phase power to provide higher voltages required for fish-trawling is also disclosed.

DESCRIPTION OF THE PREFERRED EMBODIMENT

Figures 1, 2:
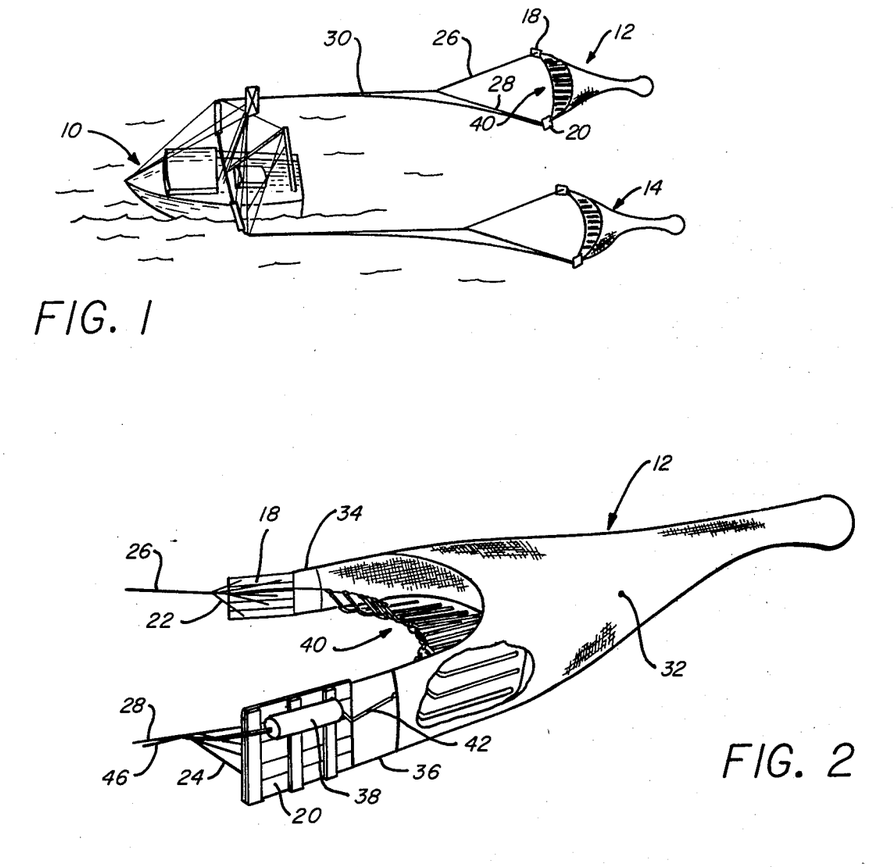
FIG. 1 illustrates schematically a boat towing two fishing trawls rigged in accordance with the present invention.
FIG. 2 is a perspective view of a trawling net of FIG. 1.

Referring now to the drawings, and in particular to FIG. 1, a boat 10 is illustrated towing first and second trawl nets 12 and 14. Trawl net 14 is similar in structure to trawl net 12 which is illustrated thus the details of only one is shown in the drawings.

Trawl net 12 includes a pair of otter doors 18 and 20 (FIG. 2) which are connected by chains 22 and 24 to bridle legs 26 and 28 and to tow cable 30. Net 32 is suspended between head rope 34 and foot rope 36. Head rope 34 extends between upper rear corners of doors 18 and 20, and foot rope 34 extends between lower rear corners of doors 18 and 20. Trawl net 12 when deployed extends substantially in the configuration illustrated as it is pulled through the water by boat 10. As has been set forth, net 14 is of like construction to net 12. Thus, like structure performing like functions bears like reference numerals.

Figure 3:
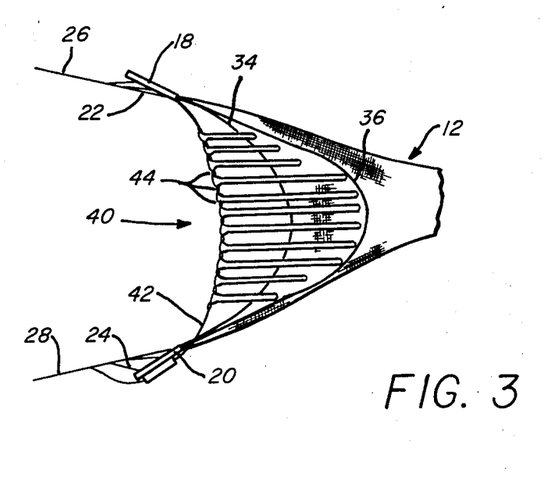
FIG. 3 is a partial plan view of a trawling net of FIG. 1.

A pulse generating circuit G (FIG. 4), as described below is disposed in water tight container 38 affixed to the rear face of door 20 and is connected to supply pulses, as will presently be described, to an electrode array 40. Array 40 includes bus wire 42 affixed to the trailing edges of doors 18 and 20 at points spaced above their lower edges so to position bus 42 a distance above the ocean bottom as trawl net 12 is pulled through the water. Floats may be attached to bus 42 if desired to keep bus 42 at a particular height above the bottom. A plurality of electrodes 44 (FIG. 3), of the array 40 are attached both electrically and mechanically to bus 42 and are weighted so as to trail along adjacent the ocean bottom. The construction of electrodes 44 of the present invention may be in the same manner as those disclosed in U.S. Pat. Nos. 3,777,388 and 4,038,560, these U.S. Patents being incorporated by reference herein. Electrode array 40 may be attached to bus 42 in the manner and configuration disclosed in U.S. Pat. Nos. 3,777,388 and 4,038,560.

It is to be noted that the foregoing U.S. patents use both positive and negative electrodes, positive and negative electrodes being positioned adjacent each other. In contrast to this, the present invention does not require alternating polarity electrodes but may instead be effectively operated with positive electrodes only, in which case a grounding plate for generating Circuit G is attached in proximity to electrode array 40. Container 38, if made of conductive material may be utilized for this purpose, with the sea water providing a conductive return path between electrodes 44 and case 38. Sea water may also be used to provide a return path to ground for generating Circuit G to the power source carried on boat 10 in lieu of a ground cable connection to bridle chain 26. However, in situations where positive and negative electrodes are used with the present invention, negative electrodes are insulated from the positive electrodes and connected to bridle legs 26 and 28 and to towing cable 30, which is subsequently connected to the common terminal of the circuitry on boat 10.

Thus in the preferred method of the present invention, fishing trawl net 12 is towed behind boat 10 by cable 30 at a depth which allows trawl net 12 to be positioned just above the ocean floor. The water immediately in advance of the trawl net 12 is charged by DC pulses, emanating from array 40 which have a repetition rate of less than six cycles per second, a pulse duration of approximately one millisecond and create an electrical field having a voltage gradient in the range of one-hundred fifty volts per meter to two hundred-twenty volts per meter. While these parameters may be varied individually or collectively, it has been discovered experimentally that optimum catches are obtained by restricting the pulse repetition rate to the range of three to four pulses per second, and by providing a pulse duration in the range of 0.75 to one millisecond. Furthermore, electric fields having a voltage gradient of one-hundred eighty volts per meter have been found to provide consistently good results.

Figure 4:
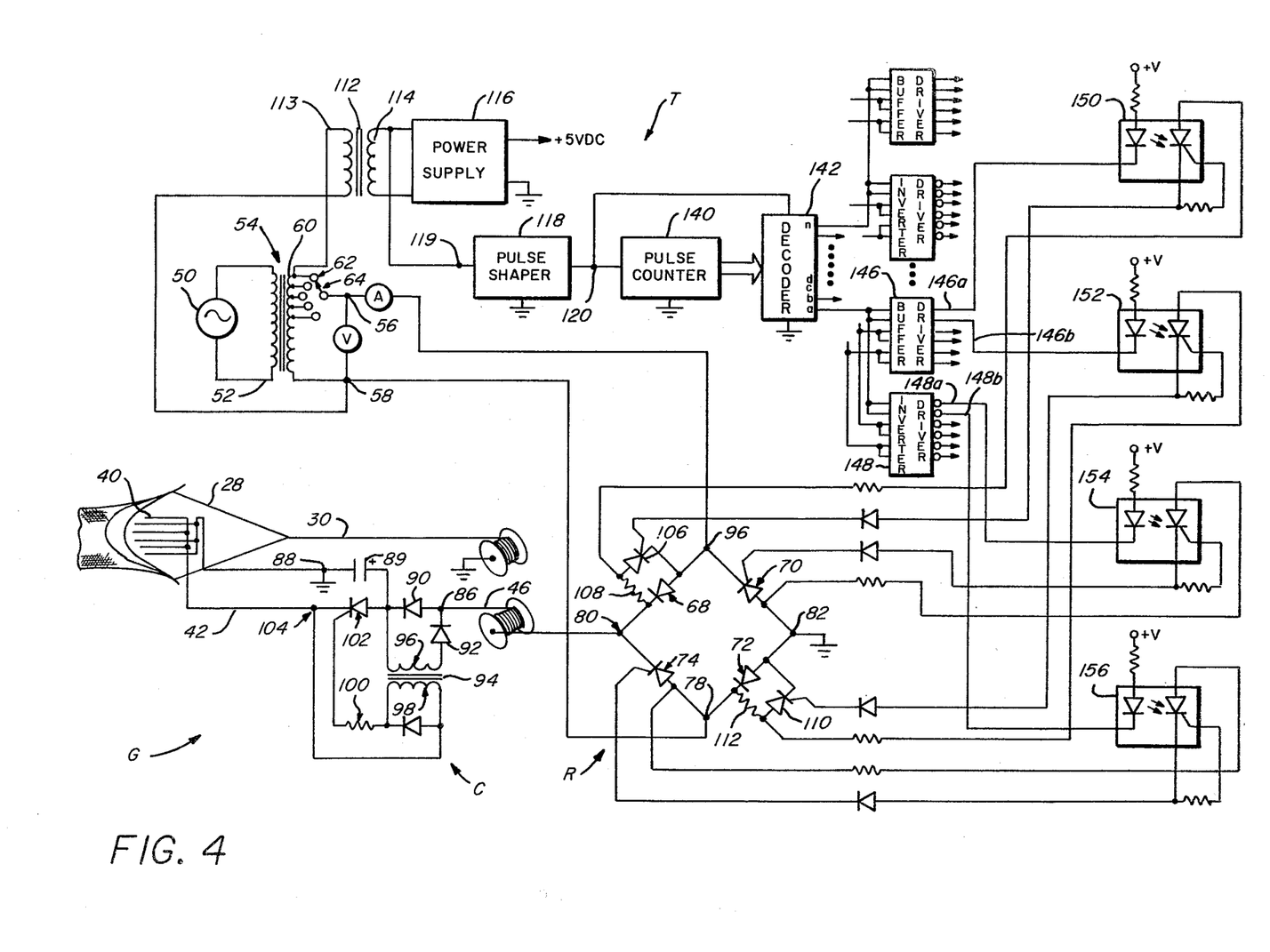
FIG. 4 is a schematic electrical circuit diagram illustrating one embodiment of the electrical system of the present invention.

The electrical pulse generating circuit G of the present invention for providing the direct current pulses to electrode array 40 is schematically illustrated in FIG. 4. In FIG. 4, a single phase alternating current generator 50 located on boat 10 is coupled directly to a primary winding 52 of a transformer 54. Transformer 54 is provided with output terminals 56 and 58 and is further provided with a plurality of taps 62 which enable the user to select one of several output voltage levels, and thus affect the field strength of the array, as will be set-forth, by switching output terminal 56 to one of tap terminals 62. In the preferred embodiment tap terminals 62 provide output voltages in the range of one-hundred twenty to two-hundred forty volts. Generator 50 and transformer 54 provide a source of alternating polarity electrical power which is transmitted to a charging circuit C via a rectifying circuit R.

Rectifying circuit R is a full-wave diode bridge circuit consisting of half-wave rectifiers 68, 70, 72 and 74. In the charging mode, as will be described below, rectifiers 70 and 74 are enabled by an appropriate gating voltage applied to their respective gate circuits. Rectifier circuit R has an input terminal 76 and an input terminal 78 which are connected to terminal 56 and 58 of transformer 54. Output terminals 80 and 82 of circuit R are connected across circuit input terminals 86 and 88 of charging circuit C. Rectifying circuit R functions as a conventional full-wave diode bridge rectifier supplying positive power at terminal 80 which is connected to circuit input terminal 86 of the charging circuit C.

Positive charging pulses at terminal 86 of charging Circuit C are passed to a positive plate of a capacitor 89 which stores an electrical charge which is to be discharged into the water by an array 40. A diode 90 prevents the discharge of current between the positive plate of capacitor 89 and terminal 86 of charging circuit C, and a diode 92 blocks current from a secondary winding 96 of transformer 94 during the charging period when positive pulses are present on terminal 86.

Capacitor 89 is charged through terminal 104 and into array 40 in the following manner:

(a) a negative potential at terminal 86 induces a reverse current from capacitor 89 through primary winding 96 of transformer 94;

(b) current in primary winding 96 produces current in secondary winding 98 of transformer 94 and a voltage drop in the gate circuit of silicon controlled rectifier 102;

(c) silicon controlled rectifier 102 is enabled by the voltage drop across secondary winding 98 of transformer 94 thereby completing a circuit path between capacitor 89 and array 40.

In the preferred embodiment, this reverse current from capacitor 89 is induced when rectifier circuit R is bypassed during a negative half-cycle of power from generator 50. Rectifier circuit R is provided with gate controlled rectifiers 106 and 110 which provide parallel paths around rectifiers 68 and 72. Resistor 108 is included in the by-pass circuit around rectifier 68 and resistor 112 is included in the by-pass circuit around rectifier 72. As previously described, rectifiers 70 and 74 are controller rectifiers which may be disabled by removing required bias voltage across their respective gate circuits. Likewise, rectifiers 106 and 110 may be enabled by an appropriate gate voltage applied to their respective gates. By disabling rectifiers 70 and 74 and concurrently enabling rectifiers 106 and 110, rectifier circuit R is effectively by-passed by providing a parallel circuit path from terminal 76 to terminal 80, and a second parallel circuit path from terminal 78 to terminal 82, during the negative going half-cycle of alternating phase power generated by generator 50.

Thus in order to induce a reverse current from capacitor 89 through primary winding 96 to terminal 86, a circuit for enabling rectifiers 106 and 110 and concurrently disabling rectifier 70 and 74 is provided. With the present invention, this current reversing function is performed at regular timed intervals, by a timing circuit T, thus producing alternating charging and discharging of capacitor 89 in charging circuit C with a repetition rate of less than six pulses a second and pulse duration of approximately one millisecond.

Figure 6:
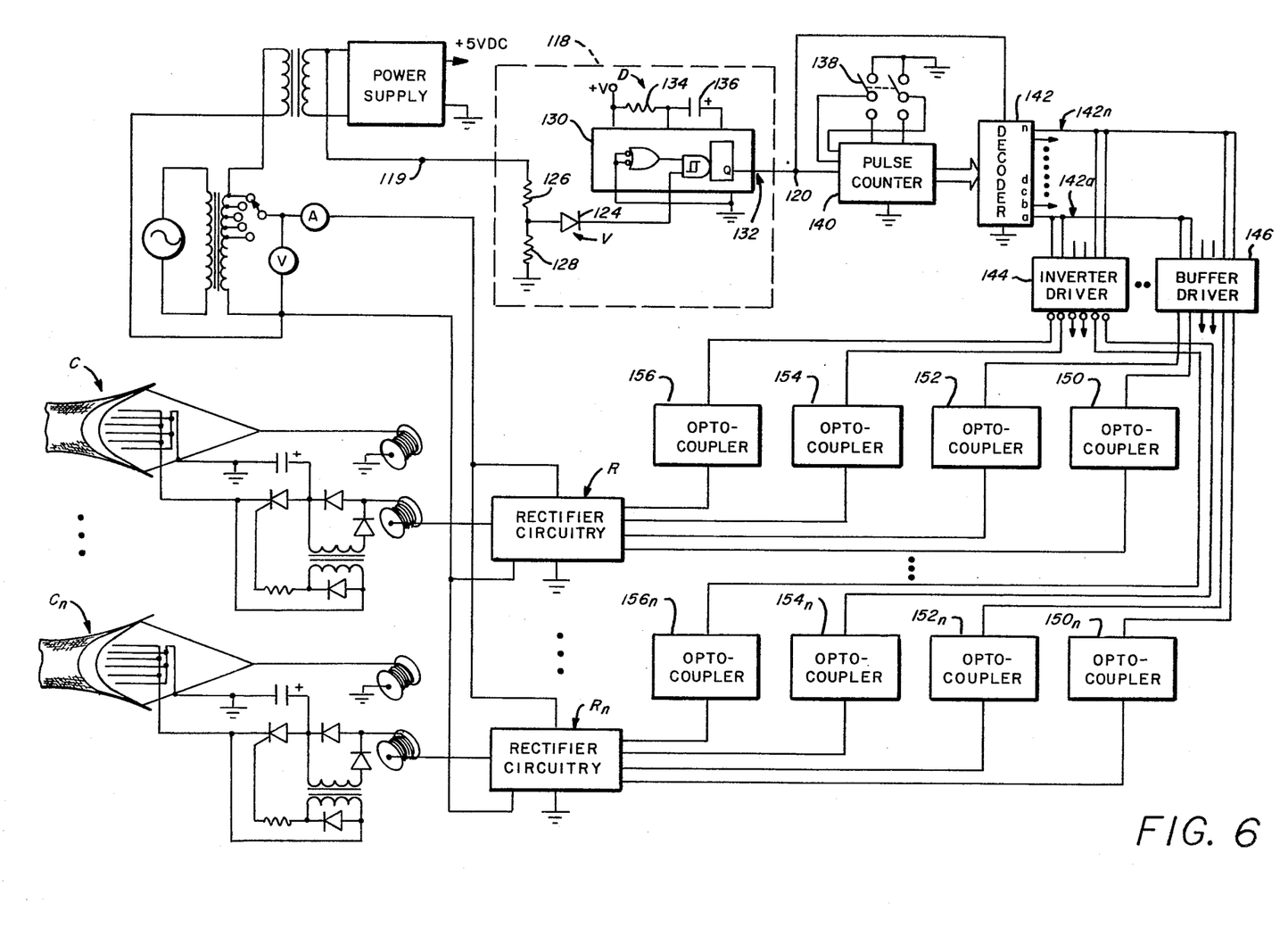
FIG. 6 is a schematic electrical circuit diagram of a portion of the electrical system of FIG. 4.

The timing circuit T includes a step down transformer 112, a power supply 116, a pulse shaper 118, a pulse counter 140, a decoder 142, drivers 146 and 148, and coupling devices 150, 152, 154 and 156. Step down transformer 112 has a secondary winding 114 connected to direct current power supply 116 which provides operating power for the remaining elements of the timing circuit T. Pulse shaper 118 has an input terminal 119 and an output terminal 120. Input terminal 119 is connected to secondary winding 114 of transformer 112. A primary winding 113 of transformer 112 is connected to secondary winding 60 of power transformer 54. Thus, the signal present at input terminal 119 is an AC signal in phase with power generated by the generator 50. Pulse shaper 118 produces a positive pulse output signal at terminal 120 which corresponds to each positive half-cycle of power generated by generator 50. Pulse shaper 118 may be in the form of a half-wave rectifier 124 in series with a one shot or monostable multivibrator 130 (FIG. 6). In FIG. 6, pulse shaper 118 includes voltage divider and rectifier circuit V, formed of diode 124, resistor 126 and resistor 128, in series with one shot multivibrator 130. Multivibrator 130 provides a square wave output signal of the same frequency as power supplied by generator 50 to output terminal 132. The pulse width of the square wave signal provided at terminal 132 is delayed by a delay circuit D connected to the appropriate output terminal of one shot multivibrator 130 (FIG. 6). This delay circuit D may consist of a resistor 134 and a capacitor 136 connected to multivibrator 130 in a conventional manner. Delay circuit D delays the high to low transition of pulses in the output signal from multivibrator 130 to occur slightly after the zero crossing of the positive half-cycle of power from power source 50. This delay, as will be described later, ensures that the rectifying circuit R and consequently charging circuit C are triggered during the negative going half-cycle of power from generator 50.

Output terminal 132 of multivibrator 130 is connected to terminal 120 (FIG. 4), and is provided to pulse counter 140. Pulse counter 140 may be any commonly available reset binary counting circuit which counts a predetermined number of pulses from pulse shaper 118, then resets. For example, if generator 50 produces sixty cycles per second, then counter 140 might count twelve pulses, then reset, to provide a reset rate of five cycles per second. Alternatively, counter 140 may reset upon the count of sixteen pulses, thereby providing a reset count rate of approximately four cycles per second (3.9). The counter 140 provides an output count number indicating the present count state. The count output of pulse counter 140 is connected to decoder 142, which may be any commonly available decoding circuit compatible with pulse counter 140 which provides a logic level output signal to one of a plurality of output terminals 142a, 142b, 142c, etc. in response to the particular count state pulse counter 140. The decoder 142 forms an input signal at one of a plurality of output terminals depending upon the particular count status of counter 140, to activate a pair of drivers 146 and 148, connected thereto. Driver 146 is a non-inverting driver, while driver 148 is an inverting driver. The number of output terminals of decoder 142, as well as the number of pairs of drivers connected thereto, is dependent on the number of counts formed in the counter 140.

For example, output terminal 142a provides output logic signals to drivers 146 and 148 during the first pulse count strobe of counter 140 and output terminal 142c and 142d provide output logic signal to drivers 146 and 148 upon the count of a third and fourth pulse by pulse counter 140. Thus, when pulse counter 140 resets at a count of twelve pulses, twelve output terminals are provided by decoder 142 each periodically forming an output signal at a regular interval, every twelfth count from counter 140.

The output signals from decoder 142 are used to trigger a bank of charging circuits, each of like structure to charging circuit C, in sequence and at regularly timed intervals. As indicated in FIG. 6, and output signal from terminal 142a triggers the first charging circuit C, and the output of terminal 142n triggers another charging circuit C.

The output signal from terminal 142a is normally a logic "1" pulsing to a logic "0" in response to the first count in the count cycle of pulse counter 140, representing the first negative half-cycle of power from generator 50, and returns to a logic "1" on the second count from counter 140 representing commencement of the second positive half-cycle of power from generator 50 (FIG. 4). A buffer driver 146 and an inverter driver 148, which may be any commonly available driver circuits, receive the individual output signals from decoder 142 at different input terminals and provide output signals in response thereto. Buffer 146 provides an output signal of like logic level to the signal presented by decoder 142 while driver 148 provides an output signal which is an inverted version. Output terminals 146a and 146b of driver 146, corresponding to the first count in the cycle of counter 140, are connected to isolator circuits 150 and 152, respectively. These isolator circuits and the others set forth below may be any circuit element providing suitable isolated coupling, and in the preferred embodiment of the present invention are optically coupled semiconductor devices. Coupling device 150 is connected to the gate circuit of silicon controlled rectifier 106 in Rectifier circuit R. Thus, during the first negative half cycle of a sequence from generator 50, counter 140 forms a pulse which passes through decoder 142 and driver 146 to coupling device 150. Since coupling device 150 is connected to silicon controlled rectifier 106, this rectifier is enabled. Similarly, coupling device 152, is connected to the gate circuit of silicon controlled rectifier 110, to enable rectifier 110 during the first negative half-cycle of a sequence from generator 50.

Output terminals 148a and 148b of driver 148, corresponding to the first count in the cycle of counter 140 are connected to coupling device 154 and 156, respectively. Since the output signal at terminals 148a and 148b is normally a logic "0", coupling devices 154 and 156 are normally enabled. The output of coupling device 154 is connected to the gate circuit of silicon controlled rectifier 70, while the output from coupling device 156 is connected to the gate circuit of silicon controlled rectifier 74. Thus, when coupling devices 154 and 156 are enabled, silicon controlled rectifier 70 and 74 are likewise enabled. When the output signals on terminals 148a and 148b go to logic "1", coupling devices 154 and 156 are disabled thereby disabling silicon controlled rectifiers 70 and 74, respectively. Thus, during the first negative half-cycle of power generated by generator 50, silicon controlled rectifiers are disabled by coupling devices 154 and 156 at the time that silicon controlled rectifiers 106 and 110 are enabled. Where generator 50 provides sixty hertz frequency power, and the count cycle of counter 140 is set at twelve, this occurs five times per second. It is noted that even though silicon controlled rectifiers 106 and 110 of rectifying circuit R are enabled, they conduct only when forward biased, and that occurs only during the negative going half-cycle of power generated by generator 50. Thus the cumulative effect of the timing and triggering circuit described above is to allow a single negative half-cycle of power from generator 50 to be passed through rectifying circuit R to input terminal 86 of charging circuit C which initiates a discharge of energy stored in capacitor 89 through electrode array 40 at regular, predetermined intervals. Each of the remaining charging circuits $C_i$ through $C_n$ in the bank is caused to discharge in a sequence in a like manner by the circuit T.

Thus, generator 50 coupled with transformer 54 provides alternating polarity single phase electrical power which is delivered through full-wave rectifying circuit R to capacitor 89 in each charging circuit C. Charge stored in each capacitor 89 is selectively discharged into the electrical load array 40 by selectively by-passing the rectifying circuit R associated therewith at regular timed intervals. Selective by-passing occurs in response to a signal from timing circuit T by disabling rectifiers 70 and 74 and enabling rectifiers 106 and 110. Capacitor 89 discharges through circuit output terminal 104 of circuit C only so long as there is charge remaining in capacitor 89 or until rectifier 102 is disabled soon after the power generated by generator 50 begins a positive going half-cycle and forward biases diode 90 cutting off diode 92. Capacitor 89 can thus discharge during a selected negative going half-cycle of power generated by generator 50, after which it is permitted to reset and begin another charging cycle. The invention thus provides a compact, lightweight pulsing circuit which may be readily deployed on underwater fishing gear and which provides the high-voltage electrical pulses necessary for effective bottom-fishing.

Figure 5:
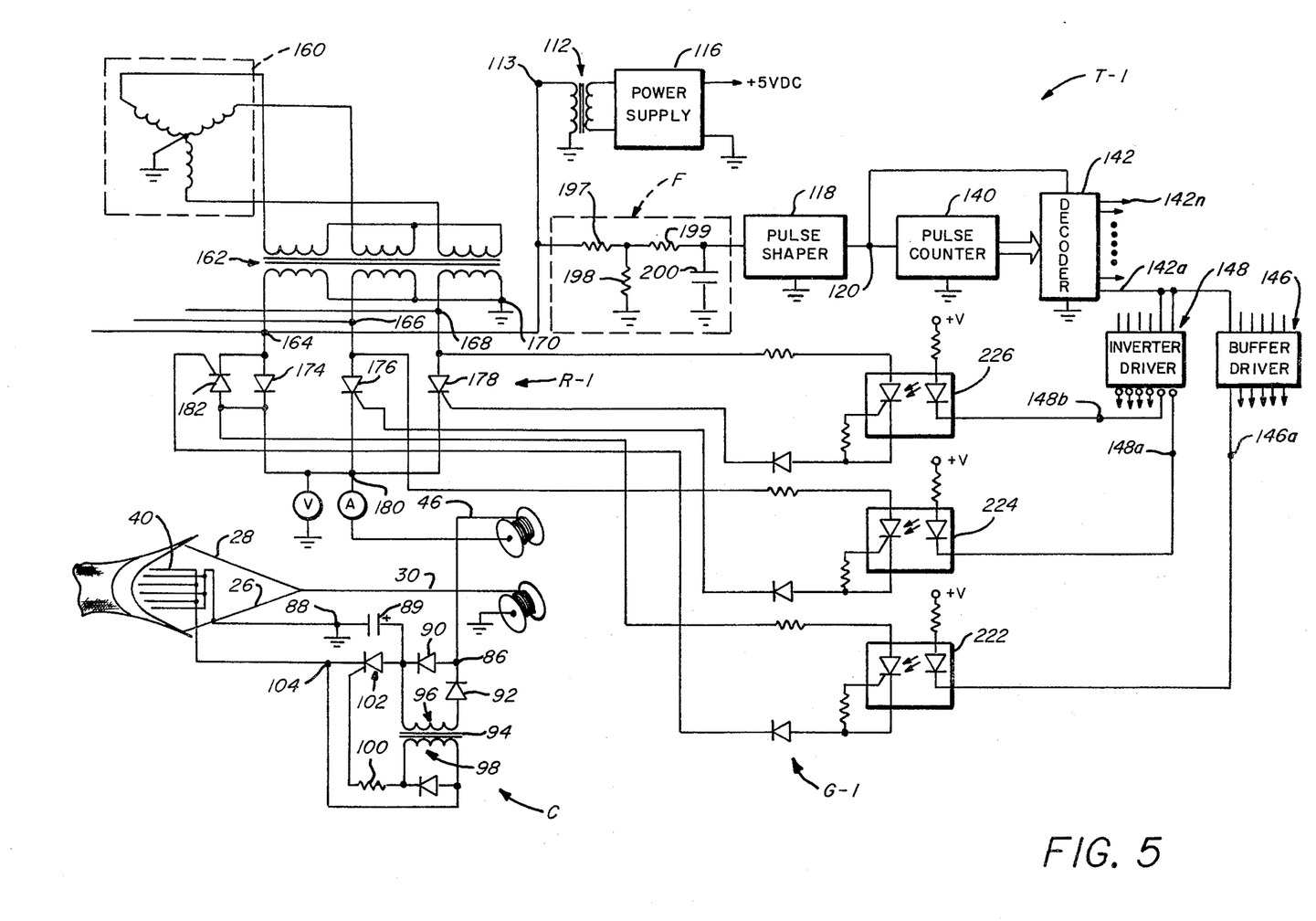
FIG. 5 is a schematic electrical circuit diagram illustrating another embodiment of the electrical system of the present invention.

In FIG. 5, an alternate embodiment G-1 of the pulse generating circuit of the present invention using three phase, half-wave rectified power to charge capacitor 89, is schematically illustrated. In generating circuit G-2, like components performing like functions bear like reference numerals. In the circuit G-1, reference numeral 160 is a source of alternating polarity three-phase electrical power which is coupled to a three phase transformer 162 having three output terminals 164, 166, and 168 and a common terminal 170. Each phase of power at terminals 164, 166 and 168 is one-hundred twenty degrees different, either advanced or delayed in phase from the other two phases. A half-wave rectifying circuit R-1 is provided in circuit G-1 in the form of half-wave rectifiers 174, 176 and 178. Rectifier 174 is a normal, non-gated rectifier while rectifiers 176 and 178 are controlled rectifiers, such as thyristors or silicon controlled rectifiers. Rectifier 174 is connected between output terminal 164 of power transformer 162 and an output terminal 180 of rectifier circuit R-1, while rectifier 176 is connected between output terminal 166 of power transformer 162 and the output terminal 180. Similarly, rectifier 178 is connected between output terminal 168 of power transformer 162 and the output terminal 180. Output terminal 180 of rectifying circuit R-1 is connected to input terminal 86 of charging circuit C which functions in the manner of circuit C in FIGS. 4 and 6.

In the circuit G-1, positive three phase charging pulses are supplied through circuit input terminal 86 of charging circuit C to charge capacitor 89. Each rectifier of circuit R-1 passes a positive half-cycle of power from transformer 162 to output terminal 180. The charging pulse which passes rectifier 174 is one-hundred twenty degrees out of phase with the charging pulses passing through rectifier 176 and rectifier 178. Likewise the charging pulse passing through rectifier 176 is one-hundred twenty degrees out of phase with the pulse passing through rectifier 174 and rectifier 178.

A reverse current is initiated between the positive plate of capacitor 89 and circuit output terminal 86 of charging circuit C by by-passing rectifier 174 in circuit R-1. This is accomplished by a bypass circuit in the form of a gate controlled rectifier 182 connected in parallel with rectifier 174. Gate controlled rectifier 182 is enabled during the negative half-cycle of the first phase of power from power source 160, providing a bypass circuit of rectifier 174. A timing circuit T-1 is provided in the circuit G-1 to discharge capacitor 89 at regular timed intervals by providing trigger signals at output terminals 146a, 148a and 148b.

Timing circuit T-1 includes step-down transformer 112, power supply 116, pulse shaper 118, pulse counter 140, decoder 142, drivers 146 and 148 and coupling devices 222, 224 and 226, which are preferably optically coupled semiconductors of the type set forth above. Timing circuit T-1 receives a clock pulse from terminal 164 in the form of the unrectified first phase of power from power source 160. In the timing circuit T-1 pulse shaper 118 may also include divider circuit F which reduces the power level of the signal from power source 160. Divider Circuit F includes resistors 197, 198 and 199 and capacitor 200 arranged and electrically connected in the manner indicated.

Pulse counter 140 counts pulses from pulse shaper 118 and resets upon reaching a given count number. Decoder 142 receives count levels from pulse counter 140 and provides output signals to terminals 142a through 142n sequentially, corresponding to a given count member of pulses counted by counter 210.

An output terminal 146a of buffer driver 146 is connected to a coupling device 222 which controls gate controlled rectifier 182 to provide a bypass circuit around rectifier 174 as set forth above. Thus when the output signal at terminal 146a changes state in response to a logic "0" signal on output terminal 142a of decoder 142, coupling device 222 is enabled, consequently enabling gate controlled rectifier 182 to provide a bypass of rectifier 174 during the negative going half-cycle of the first phase of power from power source 160. Concurrently, output signals on terminals 148a and 148b change state from a logic "0" to a logic "1", thereby disabling coupling devices 224 and 226, respectively. When coupling devices 224 and 226 are disabled, rectifiers 176 and 178 are disabled. Thus, a by-pass circuit is provided around rectifier 174 in the circuit associated with the first phase of power from power source 160, and rectifiers 176 and 178 in the circuits associated with the second and third phase of power from source 160 are simultaneously disabled. Since it is only necessary to provide a negative potential to circuit input terminal 104 in order to initiate the discharge of capacitor 89, any one of the three rectifier circuits could be by-passed to provide the necessary triggering. For example, one could choose to by-pass the second phase rectifier 176, as easily as the first phase rectifier 174, in which case rectifier 174 and 178 would be disabled to prevent positive potential from these phases from interfering with the negative trigger potential provided by the by-passed second phase circuit.

In the circuit G-1 three-phase half-wave rectified power is supplied to charging circuit C from power source 160 through rectifying circuit R-1. Charge storing capacitor 89 is selectively connected to circuit output terminal 104, thereby discharging energy stored in capacitor 89 through array 40. Discharging of energy into array 40 occurs when gate controlled rectifier 102 is enabled in response to discharge current flowing between circuit input terminal 86 and output terminal 180 of rectifier circuit R-1. This is triggered by timing circuit T-1 which selectively bypasses rectifying circuit R-1 at regular timed intervals. Timing circuit T-1 consists of a pulse counting circuit and a trigger circuit which selectively bypasses rectifier 182 in circuit R-1 and simultaneously disables rectifiers 176 and 178 in the second and third phase of power from power source 160, thereby placing a negative potential on circuit input terminal 86 of charging circuit C.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. An electrical circuit for providing high voltage level electrical pulses to an electrode for electrical bottom fishing, comprising:
   means for storing electrical charge;
   a source of alternating polarity electrical power for charging said charge storing means, said source having a positive half-cycle and a negative half-cycle;
   full-wave rectifying means, between said power source and said charge storing means for rectifying power from said alternating polarity power source and providing charging current to said charge storing means during both the positive half-cycle and the negative half-cycle of said power source;
   current reversing means for selectively reversing the direction of current to said charge storing means;
   switching means responsive to said reversal of current to said charge storing means, for connecting said charge storing means to the electrode, thereby allowing said charge storing means to discharge through the electrode.

2. The circuit of claim 1, wherein said charge storing means is a capacitor.

3. The circuit of claim 1, wherein said power source is an alternating current single-phase generator.

4. The circuit of claim 1, further comprising timing means activating said current reversing means at regular timed intervals.

5. The circuit of claim 4, wherein said timing means includes means for varying the timed intervals.

6. The circuit of claim 4, wherein said timing means comprises:
   means for counting cycles of said power source; and
   trigger means for activating said current reversing means once a predetermined number of cycles have been counted.

7. The circuit of claim 6, wherein said timing means comprises a timing circuit connected to said power source in parallel with said rectifying means.

8. The circuit of claim 7, wherein said timing circuit comprises:
   pulse shaping circuit means receiving an input signal from said power source and providing a clocking signal output, said clocking signal comprising a series of electrical pulses having a frequency correlated to the frequency of said power source;
   counting circuit means connected to said pulse shaping means for counting pulses in the clocking signal;
   trigger circuit means responsive to said counting means for providing an electrical trigger signal once a predetermined number of pulses have been counted by said counting means, for activating said current reversing means.

9. The circuit of claim 8, wherein said pulse shaping means provides pulses having a low to high transition correlated to the beginning of each positive half-cycle of said power source.

10. The circuit of claim 8, wherein said pulse shaping means provides pulses having a pulse duration longer then one-half the period of oscillation of the electrical potential from said power source.

11. The circuit of claim 8, wherein said pulse shaping means comprises a half-wave rectifier in series with a monostable multivibrator.

12. The circuit of claim 11, wherein said pulse shaping means further comprises a delay circuit connected to said multivibrator for causing pulses from said multivibrator to have a duration longer than one-half of the period of oscillation of the electrical potential from said power source.

13. The circuit of claim 8, wherein said counting means comprises a pulse counting circuit for receiving said pulses from said pulse shaping means as an input signal, and for providing a signal output corresponding to the total number of said input pulses received.

14. The circuit of claim 13, wherein said counting circuit includes means for resetting upon counting a predetermined number of input pulses.

15. The circuit of claim 14, wherein said counting circuit includes means for resetting upon counting a selected one of a number of various counts.

16. The circuit of 14, wherein said trigger circuit comprises:
   a decoding circuit, connected to said pulse counting circuit, said decoding circuit having a plurality of output terminals, said output terminals being provided with an output signal in sequence corresponding to the total number of pulses counted by said counting circuit, and wherein the output signal from one of said output terminals is selected to activate said current reversing means, thereby providing regular timed intervals for discharging said charge storing means.

17. The circuit of claim 16, wherein said decoding circuit provides the output signal to said output terminals during said negative half-cycle of said power source.

18. The circuit of claim 1 or 6, wherein said current reversing means comprises a means for selectively by-passing said full-wave rectifying means, thereby allowing an unrectified signal from said power source to be imposed on said circuit input terminal.

19. The circuit of claim 18, wherein:
said full wave rectifying means comprises a full-wave bridge circuit having a first, second, third and fourth half-wave rectifiers.

20. The circuit of claim 19, wherein:
said first rectifier and said third rectifier are connected so as to be forward biased during said positive half-cycle of said power source;
said second rectifier and said fourth rectifier are gate controlled rectifiers which may be selectively disabled, and are connected to be forward biased during said negative half-cycle of said power source;
said full-wave rectifying means further comprises a first gated by-pass circuit around said first rectifier and a second gated by-pass circuit around said third rectifier so that said first rectifier and said third rectifier may be selectively by-passed; and
said current reversing means comprises a gating circuit for selectively disabling said second rectifier and said fourth rectifier, and simultaneously enabling said by-pass circuits around said first rectifier and said third rectifier.

21. The circuit of claim 20, wherein:
said gated by-pass circuit of said first rectifier is comprises a gate controlled rectifier connected in parallel with said fist rectifier means;
said gated by-pass circuit of said third rectifier means comprises a gate controlled rectifier connected in parallel with said third rectifier means; and
said gate controlled rectifiers in said by-pass circuits being connected so as to be forward biased during the negative half-cycles of said power source.

22. The circuit of claim 21, wherein said gating circuit comprises:
a buffer driver circuit, having an input terminal and an output terminal, and providing a non-inverted pulse output signal in response to a pulse input signal;
an inverting driver circuit, having an input terminal and an output terminal and providing an inverted pulse output signal in response to a pulse input signal;
a trigger circuit connected to said buffer circuits for providing a positive pulse input to said buffer circuits;
said inverting driver circuit being connected to said gates of said gate controlled rectifiers in said gated by-pass circuits;
said buffer driver circuit being connected to said gates of said second rectifier means and said fourth rectifier means, whereby said gated by-pass circuits are enabled and said second rectifier means and said fourth rectifier means are disabled in response to said positive pulse supplied by said trigger circuit.

23. The circuit of claim 22, further comprising
first coupling means connected between said output terminal from said inverting driver and said first gated by-pass circuit;
second coupling means connected between said output terminal from said inverting driver and said second gated by-pass circuit;
third coupling means connected between said output terminal of said buffer driver and said second rectifier means; and
fourth coupling means connected between said output terminal of said buffer driver and said fourth rectifier means.

24. The circuit of claim 1, wherein said switching means comprises:
a gate controlled rectifier, connected between said charge storing means and said electrode;
a gate circuit for said gate controlled rectifier, responsive to said reverse current to said charge storing means, for enabling said gate controlled rectifier and thereby allowing said charge storing means to discharge through said electrode.

25. The circuit of claim 24, wherein said gate circuit comprises inductive coupling means device having a first winding connected in series between said rectifying means and said charge storing means and a second winding connected to said gate controlled rectifier so that said reverse to said charge storing means produces a forward biasing potential in said gate circuit of said gate controlled rectifier thereby enabling said gate controlled rectifier.

26. An electrical circuit for providing high voltage level electrical pulses to an electrode for electrical bottom fishing, comprising:
means for storing electrical charge;
a source of alternating-polarity, three-phase rectified electrical power connected to said charge storing means for providing electrical power to charge said charge storing means;
current reversing means for selectively reversing the direction of current to said charge storing means;
switching means responsive to said reversal of current to said charge storing means, for connecting said charge storing means to the electrode, thereby allowing said charge storing means to discharge through the electrode.

27. The circuit of claim 26, further comprising a timing means for activating said current reversing means at regular timed intervals.

28. The circuit of claim 27, wherein said timing means comprises:
means for counting cycles of said power from said source; trigger means for activating said current reversing means once a predetermined number of said cycles have been counted.

29. The circuit of claim 28, wherein said timing means comprises a timing circuit connected to said power source in parallel with said charge storing means.

30. The circuit of claim 29, wherein said timing circuit comprises:
a pulse shaping circuit means, receiving an input from said power source and providing a clocking signal output comprising a series of electrical pulses having a frequency correlated to the frequency of said power source;
counting circuit means, connected to said pulse shaping means, for counting pulses in the clocking signal;
trigger circuit means, responsive to said counting means, for providing an electrical trigger signal, once a predetermined number of said pulses have been counted by said counting means, for activating said current reversing means.

31. The circuit of claim 30, wherein said pulse shaping means provides pulses having a low to high transistion correlated to the beginning of each positive half cycle of one phase of power from said power source.

32. The circuit of claim 30, wherein said pulse shaping means provides pulses having a pulse duration longer than one-half the period of oscillation of power from one phase of said power source.

33. The circuit of claim 30, wherein said pulse shaping means comprises a half-wave rectifier in series with a monostable multivibrator.

34. The circuit of claim 33, wherein said pulse shaping means further comprises a delay circuit connected to said multivibrator for causing pulses from said multivibrator to have a duration longer than one-half of the period of oscillation of one phase of power from said power source.

35. The circuit of claim 30, wherein said counting means comprises a pulse counting circuit for receiving said pulses from said pulse shaping means as an input, and for providing a signal output corresponding to the total number of input pulses received.

36. The circuit of claim 35, wherein said counting circuit resets upon counting a predetermined number of pulses.

37. The circuit of claim 36, wherein said trigger circuit comprises:
a decoding circuit, connected to said pulse counting circuit, said decoding circuit having a plurality of output terminals, said output terminals being provided with a decoded output signal in sequence corresponding to the total number of pulses counted by said counting circuit, and wherein the decoded output signal from one of said output terminals is selected to activate said current reversing means, thereby providing regular timed intervals for discharging said charge storing means.

38. The circuit of claim 37, wherein said decoding circuit provides the decoded output signal to said output terminals during the negative half-cycle of the first phase of power from said power source.

39. The circuit of claim 26, further comprising:

a first, second and third rectifying means connected in parallel between said power source and said charge storing means; and wherein
said current reversing means comprises a means for selectively by-passing said first rectifying means, and allowing unrectified power from said first rectifying means to be provided to said charge storing means.

40. The circuit of claim 39, wherein:
said second and said third rectifying means are gate controlled rectifiers;
said circuit further comprises a gated by-pass circuit connected in parallel around said first rectifier means; and
said current reversing means comprises a gating circuit for selectively disabling said second and third rectifying means and simultaneously enabling said gated by-pass circuit around said first rectifying means.

41. The circuit of claim 40, wherein said gated by-pass circuit comprises a gate controlled rectifier connected in parallel with said first rectifier means, said gate controlled rectifier in said by-pass circuit being connected so as to be forward biased during the negative half-cycle of said first phase of power from said power source.

42. The circuit of claim 26, wherein said switching means comprises:
a gate controlled rectifier, connected between said charge storing means and said power source;
a gate circuit for enabling said gate controlled rectifier in response to said reverse current to said charge storing means thereby allowing said charge storing means to discharge through the electrode.

43. The circuit of claim 42, wherein said gate circuit comprises inductive coupling means having a first winding connected in series between said power source and said charge storing means, and a second winding connected to said gate controlled rectifier so that said reverse current to said charge storing means produces a forward biasing potential in the gate circuit of said gate controlled rectifier.

* * * * *